United States Patent [19]

Rickus

[11] Patent Number: 4,673,287
[45] Date of Patent: Jun. 16, 1987

[54] LASER-OPTICAL SURVEYING SYSTEM

[75] Inventor: Edmund Rickus, Oestrich-Winkel, Fed. Rep. of Germany

[73] Assignee: Nestle & Fischer, Fed. Rep. of Germany

[21] Appl. No.: 617,806

[22] Filed: Jun. 6, 1984

[30] Foreign Application Priority Data

Jun. 18, 1983 [DE] Fed. Rep. of Germany ....... 3321990

[51] Int. Cl.⁴ ..................... G01C 3/08; G01C 15/06
[52] U.S. Cl. ........................................... 356/4; 33/294
[58] Field of Search ............... 356/4, 152; 235/375, 235/454, 462, 467; 33/293, 294

[56] References Cited

U.S. PATENT DOCUMENTS

| | | | |
|---|---|---|---|
| 3,541,310 | 11/1970 | Stites | 235/462 |
| 3,555,285 | 1/1971 | Irving | 250/230 |
| 3,736,058 | 5/1973 | Iadarola | 356/4 |
| 3,790,277 | 2/1974 | Hogan | 356/4 X |
| 3,894,230 | 7/1975 | Rorden et al. | 356/400 X |
| 4,200,787 | 4/1980 | Carson | 356/152 X |
| 4,439,672 | 3/1984 | Salaman | 235/454 X |
| 4,450,350 | 5/1984 | Hardy | 235/467 |

Primary Examiner—Stephen C. Buczinski
Assistant Examiner—Linda J. Wallace
Attorney, Agent, or Firm—Birch, Stewart, Kolasch & Birch

[57] ABSTRACT

A laser-optical surveying system comprising a leveling system which uses a surveyor's rod wherein a laser beam rotates in a horizontal plane and is adapted to strike a surveyor's rod. The surveyor's rod is equipped with a coding representing the length, that is, in the case of a leveling system, representing the altitude, which can be read with the laser light so that an optical signal representing the altitude is generated when the laser beam passes the rod. The latter is then converted to an electronic signal and serves, when electronically processed, for displaying the height of the laser beam on the surveyor's rod.

4 Claims, 3 Drawing Figures

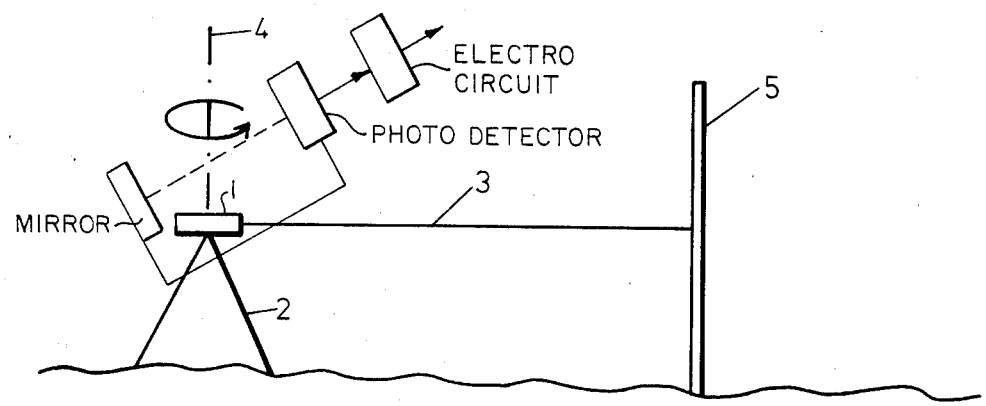
Fig. 1
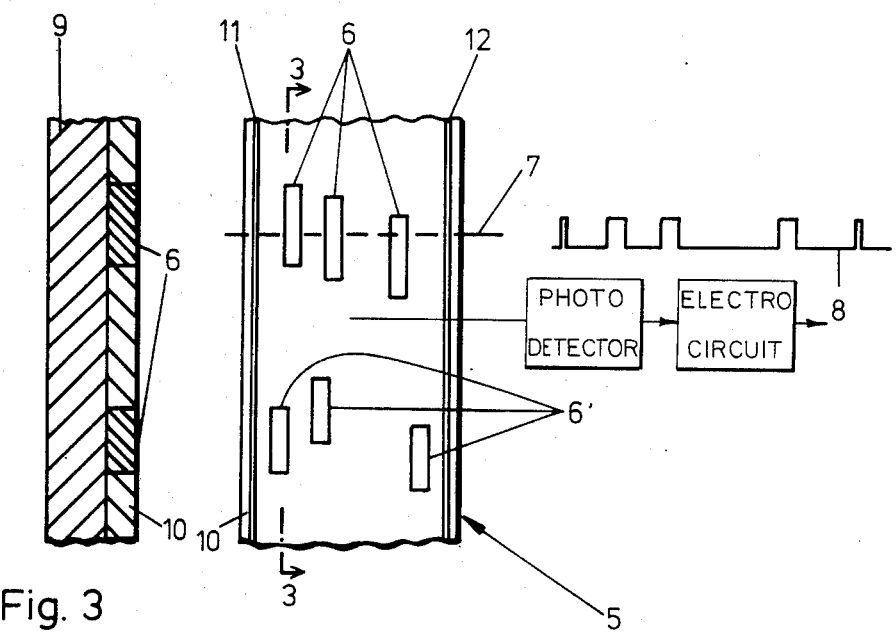
Fig. 3
Fig. 2

LASER-OPTICAL SURVEYING SYSTEM

The present invention refers to a laseroptical surveying system wherein a laser beam rotating in one plane strikes a surveyor's rod.

For the measuring or controlling of altitudes, either traditional optical systems with a surveyor's rod and leveling instrument are currently or partially employed. Also systems are employed which use a rotating laser beam, fixed at a certain height, as a reference level. Since the recording of measured data, even for the latter systems, requires the mechanical adjustment of a sensor on the surveyor's rod, with a subsequent reading of the measured value, these latest systems as well can only partially compensate for the disadvantages of traditional systems, e.g. time and personnel requirements, and no direct data processing.

Therefore, the present invention is based on the task of creating a surveying system of the above-mentioned type which provides a fast, fully automatic data recording with subsequent data processing at comparatively low costs. The invention solves this task by the fact that the surveyor's rod—on the side facing the incident laser beam—is equipped with a coding (6) which generates a pulse sequence representing the altitude when the laser beam passes the rod. The coding is such that the measuring ranges in the desired resolution are defined along the surveyor's rod. If the rotating laser beam strikes the horizontally standing surveyor's rod during measuring, the signal reading reflects the incident area of the laser beam on the surveyor's rod, this means e.g. the required altitude. The optical signal generated in accordance with the coding, is converted—by means of optoelectronical moduls—into an electrical signal, and is—by means of an electronic circuit—processed and displayed. This electronic circuit may be provided on the surveyor's rod, or separated from it. e.g. connected through electrical circuits. It is advantageous that the display takes place in a digitized form, stating the distance of the incident area compared to the foot point of the surveyor's rod.

In order to develop the invention further, it is planned that the surveyor's rod—virtually on the entire side facing the laser beam—is provided with a photoelectrically sensitive layer for the laser light on which the coding takes place.

In accordance with the present invention, the coding may be provided in two ways. On one side, the photoelectrically sensitive layer may be equipped with a lighttight protection in which light-transmissive recesses are provided. This lighttight protection may e.g. consist of a lighttight foil or a sheet metal in which recesses corresponding to the coding, have been provided. The photoelectrically sensitive layer may also be printed over so that it is lighttight.

On the other side, the present invention provides the possibility to equipping the light-sensitive layer with lighttight marks. They may also consist of lighttight sections which may be printed there over, or, in the event of foils or other protection means, clued on. It is also possible to equip the photoelectrically sensitive layer with recesses corresponding to the coding.

A variation of the present invention is possible in the event that the surveyor's rod—instead of the photoelectrically sensitive layer—is equipped with a lightconductive and/or fluorescent layer which transmits the light pulses reflecting the coding to photodetectors. It would be advantageous in this case to provide the photodetectors directly on the surveyor's rod. The electrical signals generated there may then, as stated above, be processed and displayed in a traditional manner.

In order to increase the information contents to be determined by the coding as far as possible, it is proposed as a further development of the present invention that the layer is incremented along the surveyor's rod to match the codings. Thereby, the density of information to be obtained with the coding is increased so that the surveyor's rod as such may be dimensioned comparatively narrow and handy.

Finally, the invention proposes that, instead of the photoelectrically sensitive layer, an essentially unidrectional reflecting layer is provided which reflects the light pulses reflecting the coding to a photodetector rotating in synchronism with the laser beam. For this version, the surveyor's rod, in accordance with the invention, has a comparatively simple design. The signals reflecting the coding are received and processed in the area of the laser transmitter by a photodetector. It has been proven that, in particular for relatively limited construction sites, the direction effect of such a reflecting layer is sufficient in order to guarantee the necessary accuracy of measurement.

Further details, characteristics and advantages of the invention result from the following description as well as from the drawings, wherein, FIG. 1 shows a basic representation of the method of operation of a laseroptical surveying system in accordance with the present invention;

FIG. 2 shows a partial front view of a surveyor's rod in accordance with the present invention, and FIG. 3 shows a cut taken along line 3—3 of FIG. 2.

In accordance with FIG. 1, a laser transmitter 1 is mounted on a tripod 2. The laser transmitter transmits a laser beam 3 in a horizontal direction. The latter rotates normally to diffracted through a mirror or a prism in a horizontal plane around an axis 4 where it strikes the surveyor's rod 5.

This surveyor's rod 5 has on its entire length a specific coding which marks individual measuring ranges, such as a centimeter rage. It is equipped, on the side facing the laser beam 3, with a photoelectrically sensitive layer 10 which again is equipped with the coding 6. When passing the surveyor's rod 5, the laser beam 3 generates in the sensitive layer 10 a current and/or voltage sequence corresponding to the coding 6. By means of a simple electronic circuit, the appropriate pulse sequences may be attributed to a certain altitude on the surveyor's rod, and they may be displayed, stored and/or processed. Since the pulse frequency, in the event of a fixed speed of rotation of the laser beam 3, depends on the distance laser transmitter—surveyor's rod, a start and stop impulse for the electronics generated by the laser beam 3 may be generated by additional marks 11, 12 on the rod 5. These marks 11, 12 may at the same time be used for a rough estimate of the distance of the laser transmitter from the measuring point.

In order to avoid measuring errors which may be caused by interfering light, it is recommended to cover the light-sensitive layer of the surveyor's rod with filters which are transmissive for the laser light.

An alternative of the system described above results from the possibility to replace the photoelectrically sensitive layer by a light-conductive structure. The latter must transfer the laser light pulses generated by the coding to one of its ends where they are then converted into electrical pulses by conventional photodetectors. Appropriate effects are possible by the use of fluorescent layers which transmit the fluorescent light generated by the laser to the photodetector.

According to the need, this structure may be an homogeneous "light-conductive" structure or an appropriate configuration of "light-conductive" stripes. If, in the latter case, the light of each stripe is detected by a separate photo diode, then the user will have the possibility to scan the codings 6 by columns, i.e. with an increased density of information.

Another variation of the described system results from the possibility to use, instead of the light-sensitive layer, commercially available reflectors or a reflecting foil on the surveyor's rod. Together with the coding applied on it, e.g. by printing, this combination provides a pattern made of reflecting and non-reflecting areas on the rod which characterize the altitude. If the reflector is made so that it reflects the incident laser light in its angle of incidence, as this is e.g. known for prism reflectors, then the conversion of the optical signal into an electrical signal may take place on the laser equipment itself. By means of an appropriate lense or a mirror arranged aroundd the primary beam, the reflected light pulses may then be displayed on a small, commercially available photodetector, and may be processed by the following electronic equipment. In this case, the mirror and the photodetector must rotate with the laser beam. In order to avoid measuring errors due to interfering light, the photodetector should be protected by appropriate filters as well.

In order to guarantee any desired place of reading, the electrical signal generated by the photodetector may be transmitted by a simple transmitter and may be received and read, with an appropriate portable receiver, at any spot of the construction site, in particular, at the rod 5 itself. Another advantage of the described version of the system consists of the fact that only simple, moderately priced and commercially available components are used, and that the rod 5 itself remains relatively insensitive to mechanical stress.

FIG. 2 shows a partial front view of a surveyor's rod 5 equipped with a coding 6. When the laser beam 3 passes the rod 5 in the plane of the dotted line 7, an electrical signal in accordance with reference 8 is generated which e.g. is characteristic for the altitude opposite the foot point of the rod 5.

FIG. 3 shows the object of FIG. 2 in a cross section taken along line 3—3. The surveyor's rod 5 consists of the rod itself 9 made of a carrier material, such as wood, plastic or metal. It is covered with a photoelectrically sensitive layer 10, and the example shows a coding 6 with recesses in the layer 10. The coding may also be clued or printed on the continuous layer 10. In this case, the coding marks 6 are made of a material which is lighttight for the laser light. For the photoelectrically sensitive layer 10 e.g. cadmium selenide, cadmium sulfide, amorphous silicon, or a photo-voltaic cell may be chosen.

The layer 10 is equipped with electrical conductors (not shown) which collect the generated signals 8 and lead them to an electrical circuit for further processing.

Instead of the photoelectrically sensitive layer 10, a light-conductive or fluorescent layer 10 may be provided. In this case, photodetectors must be provided in the rim areas of this layer 10 which convert the light pulses obtained into electrical signals. For the rest, the processing takes place as described for FIGS. 2 and 5.

Finally, the layer 10 may also be a reflecting layer. In this case, the reflected light pulses are represented on a photodetector which is arranged in the area of the laser transmitter and which is rotating with the laser beam 3. A following electronical system then processes the pulse sequence thus obtained.

The accuracy of measurement and the sensitivity may be significantly increased for each of the described versions, if the layer 10 is equipped with a filter for daylight so that the incident laser light alone is effective for the obtaining of the signals. This filter may be a foil which is applied on the layer 10.

A laseroptical surveying system comprising, in particular, a leveling system which uses a surveyor's rod, wherein, a laser beam rotates in a horizontal plane and is adapted to strike a surveyor's rod. The surveyor's rod is equipped with a coding representing the length, i.e., in the event of a leveling system, representing the altitude which can be read with the laser light so that an optical signal representing the altitude is generated when the laser beam passes the rod. The latter is converted into an electronic signal and serves, when electronically processed for displaying the height of the laser beam on the surveyor's rod.

I claim:

1. A surveyor's rod for a laser-optical surveying system wherein a laser beam rotates in a horizontal plane and is adapted to strike the rod having a receiving surface for the laser beam on substantially the entire side of the rod facing the incident laser beam, said receiving surface being formed by a photoelectrically sensitive layer which comprises
    predetermined measuring ranges corresponding to the altitudes to be surveyed disposed on said receiving surface, each of said measuring ranges being marked by a different coding, said codings being formed by interruptions in the receiving surface, and
    means for generating pulse sequences when the laser beam strikes the coding as well as the receiving surface, said pulse sequences being different from each other depending on the coding contacted by the laser beam.

2. The surveyor's rod as claimed in claim 1 wherein the photoelectrically sensitive layer is covered with a light-tight protection in which light-transmissive recesses are provided for forming the codings.

3. The surveyor's rod as claimed in claim 2 wherein the photoelectrically sensitive layer is provided with light-tight marks forming the codings.

4. The surveyor's rod as claimed in claim 2 wherein the photoelectrically sensitive layer is incremented along the rod to match the codings.

* * * * *